United States Patent
Jeon

(10) Patent No.: US 7,391,962 B2
(45) Date of Patent: Jun. 24, 2008

(54) OPTICAL RECORDING/REPRODUCING APPARATUS HAVING A FUNCTION OF SEPARATING LUMINANCE AND COLOR COMPONENTS

(75) Inventor: Hyoung-woo Jeon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 675 days.

(21) Appl. No.: 10/956,098

(22) Filed: Oct. 4, 2004

(65) Prior Publication Data
US 2005/0201735 A1    Sep. 15, 2005

(30) Foreign Application Priority Data
Mar. 9, 2004  (KR) .................. 10-2004-0015733

(51) Int. Cl.
*H04N 7/26* (2006.01)

(52) U.S. Cl. .................. 386/112; 386/46; 386/109; 382/232

(58) Field of Classification Search .................. 386/46, 386/109–112, 124–126; 382/232, 233; 369/53.3, 369/53.34; 713/189; 380/203; 348/402, 348/407, 413, 416
See application file for complete search history.

(56) References Cited

U.S. PATENT DOCUMENTS

| | | | | |
|---|---|---|---|---|
| 3,996,605 A | * | 12/1976 | Coffey | 386/16 |
| 4,743,977 A | * | 5/1988 | Yoshioka et al. | 386/35 |
| 4,785,349 A | * | 11/1988 | Keith et al. | 375/240.23 |
| 4,908,698 A | * | 3/1990 | Enomoto et al. | 348/396.1 |
| 5,036,386 A | * | 7/1991 | Yasumoto et al. | 348/432.1 |
| 5,095,354 A | * | 3/1992 | Sokawa et al. | 348/452 |
| 5,146,318 A | * | 9/1992 | Ishizuka et al. | 348/669 |
| 5,187,568 A | * | 2/1993 | Srivastava | 348/712 |
| 5,374,956 A | * | 12/1994 | D'Luna | 348/275 |
| 5,526,129 A | * | 6/1996 | Ko | 386/16 |
| 5,905,534 A | * | 5/1999 | Sumihiro et al. | 375/240.15 |
| 6,453,055 B1 | * | 9/2002 | Fukumura et al. | 382/103 |
| 6,628,222 B2 | * | 9/2003 | Go | 341/155 |
| 7,020,062 B2 | * | 3/2006 | Kuroda et al. | 369/53.34 |
| 7,171,050 B2 | * | 1/2007 | Kim | 382/232 |

FOREIGN PATENT DOCUMENTS

CN    2492976 Y    5/2002

OTHER PUBLICATIONS

The First Office Action issued on Sep. 28, 2007 by the State Intellectual Property Office of P.R. China in the corresponding Chinese Application No. 200510007207.2 (11 pages) with an English translation consisting of 3 pages.

* cited by examiner

*Primary Examiner*—Thai Tran
*Assistant Examiner*—Mishawn Dunn
(74) *Attorney, Agent, or Firm*—Staas & Halsey LLP

(57) ABSTRACT

An optical recording/reproducing apparatus comprising an audio and video (A/V) codec having a function for separating luminance and color components. A video decoder converts an analog video signal into a digital video signal; an A/V codec having a pre-compression processing unit separates luminance and color components from the converted digital video signal; an encoder compresses the digital video signal having the separated luminance and color components into a predetermined compression format; and a decoder decodes the digital video signal compressed in the predetermined compression format. A memory provides a storage space as the A/V codec carries out signal processing. Accordingly, the size and production cost of the video decoder may be reduced.

17 Claims, 6 Drawing Sheets

US 7,391,962 B2

OPTICAL RECORDING/REPRODUCING APPARATUS HAVING A FUNCTION OF SEPARATING LUMINANCE AND COLOR COMPONENTS

CROSS-REFERENCE TO RELATED APPLICATIONS

This application claims the benefit of Korean Patent Application No. 2004-15733, filed Mar. 9, 2004, in the Korean Intellectual Property Office, the disclosure of which is incorporated herein by reference.

BACKGROUND OF THE INVENTION

1. Field of the Invention

The present invention relates to an optical recording/reproducing apparatus having a function of separating luminance and color components of a video signal. More particularly, the present invention relates to an optical recording/reproducing apparatus having an audio/video (A/V) codec, rather than a video decoder which separates the luminance and color components of a video signal.

2. Description of the Related Art

A conventional optical recording/reproducing apparatus inputs an analog signal, converts the analog signal into a digital signal, compresses the digital signal in a certain compression format to record the compressed digital signal in a recording medium, decompresses the stored digital signal, and reproduces the decompressed digital signal into an analog signal.

The optical recording media as recording media being currently used are classified into read-only recording media such as compact disc (CD)-read only memories (ROMs) and digital versatile disc (DVD)-ROMs, write-once recordable media such as CD±recordables (CD-Rs) and DVD±Rs, and re-writable recording media such as DVD±rewritables (RWs) and DVD-random access memories (RAMs).

The above recording media randomly access data recorded on a hard disc drive (HDD), record video and audio data of high quality, and quickly and conveniently record data compared to the recording on conventional video tapes. Currently, the disk type recording media are being more frequently used more for recording and/or reproduction.

FIG. 1 is a block diagram of an exemplary conventional optical recording/reproducing apparatus.

As shown in FIG. 1, the conventional optical recording/reproducing apparatus comprises a video decoder 110, a decoder memory 111, an audio analog-to-digital converter (A/D converter) 115, an A/V codec 130, a memory 140, a flash memory 145, a system controller 150, a video encoder 170, and an audio digital-to-analog converter (D/A converter) 180. The A/V codec 130 comprises an encoder 133 and a decoder 136 formed as a unit.

Analog video and audio signals are input from diverse signal sources such as a broadcast reception antenna, a computer, and a settop box.

The optical recording/reproducing apparatus processes the signals into video and audio signals for outputs, and the video and audio signals are displayed through an image display unit such as a cathode ray tube (CRT) or a liquid crystal display (LCD) and output through a sound output unit such as a speaker, respectively.

The video decoder 110 converts an analog video signal into an input digital video signal. Further, the video decoder 110 separates luminance and color components from the digital video signal. The decoder memory 111 is used for separating the luminance and color components. The audio A/D converter 115 converts an analog audio signal into a digital audio signal. The analog video and audio signals may be provided from one of the plurality of diverse sources.

The encoder 133 encodes the input digital signal in an established compression format, and mixes encoded data to generate a data stream. For example, when the input digital signal is encoded in an MPEG format, the encoder 130 encodes the input digital video signal in a moving picture experts group (MPEG)-2 (Video) format referred to as ISO/IEC 13818-3, and encodes a digital audio signal in a Dolby AC-3 digital standard. The MPEG data stream output from the encoder 133 is recorded on a recording medium or on a hard disc drive (HDD).

The decoder 136 decodes data applied from either the recording medium or the HDD. That is, the decoder 136 decodes by decompressing a signal compressed in a certain compression format for an output. The signal decoded by the decoder 136 is output to the video encoder 170 and an audio D/A converter 180.

The video encoder 170 encodes the digital video data of the decoder 136 for an analog video output. The audio D/A converter 180 converts the digital audio signal of the decoder 136 into an analog audio signal for an analog audio output.

The flash memory 145 stores an operating system and various application programs for operating the optical recording/reproducing apparatus.

The system controller 150 controls overall operations of the optical recording/reproducing apparatus based on a user's input signal applied through a key or a remote controller.

The conventional optical recording/reproducing apparatus comprises the video decoder 110 built with functions for separating luminance and color components of the analog input video signal. Thus, the conventional optical recording/reproducing apparatus has a problem that additional circuitry is required to carry out such functions. Therefore, a size of the video decoder and a production cost due to the additional circuitry are unnecessarily increased.

Further, the conventional optical recording/reproducing apparatus requires a dedicated decoder memory 111 in order to carry out functions for the video decoder to separate the luminance and color components.

SUMMARY OF THE INVENTION

The present invention has been developed in order to solve the above and/or other problems associated with the conventional arrangement. An aspect of the present invention is to provide an optical recording/reproducing apparatus having an A/V codec or an encoder, rather than a video decoder, to carry out functions of separating luminance and color components.

Another aspect of the present invention is to provide an optical recording/reproducing apparatus comprising a video decoder which does not require a memory and an additional circuit for separating the luminance and color components.

Additional aspects and/or advantages of the invention will be set forth in part in the description which follows and, in part, will be obvious from the description, or may be learned by practice of the invention.

In order to achieve the above and/or other aspects of the present invention, there is provided an optical recording/reproducing apparatus for recording and reproducing data to and from an optical medium, comprising a video decoder which converts an analog video signal into a digital video signal, an A/V codec comprising a pre-compression processing unit which separates luminance and color components from the converted digital video signal, an encoder which compresses the digital video signal, from which the luminance and color components are separated, in a predetermined compression format, and a decoder which decodes the digital video signal compressed in the predetermined compression format, and a memory used for a storage space as the A/V codec carries out signal processing, e.g., the separation, the encoding, the compression and the decoding.

The pre-compression processing unit filters the converted digital video signal and separates the luminance and color components. Alternatively, the pre-compression processing unit compares pixel by pixel a predetermined number of consecutive frames of frames comprising the converted digital video signal, and separates the luminance (Y) and color (C) components.

The pre-compression processing unit comprises a 3-dimensional (3D) Y/C separator which compares, pixel by pixel, the predetermined number of consecutive frames among frames constructing the converted digital video signal, and separates the luminance and color components, and a time base corrector (TBC) which stabilizes synchronization of the digital video signal from which the luminance and color components are separated.

The pre-compression processing unit further comprises a noise attenuator which removes noise included in the synchronization-stabilized digital video signal.

The pre-compression processing unit bypasses the converted digital video signal to the encoder if the luminance and color components are separated from the converted signal.

The video decoder comprises a clamp module which clamps the analog video signal to a predetermined reference level, an automatic gain control module which controls a gain of the clamped analog video signal to a predetermined magnitude, and an A/D converter which converts the gain-controlled analog video signal into the digital signal.

The analog video signal may be one of a radio frequency (RF) signal, a composite video banking sync (CVBS) signal, a super-video (S-video) signal, a Y/C signal, and a component signal.

The predetermined compression format may be a moving picture experts group (MPEG) format.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
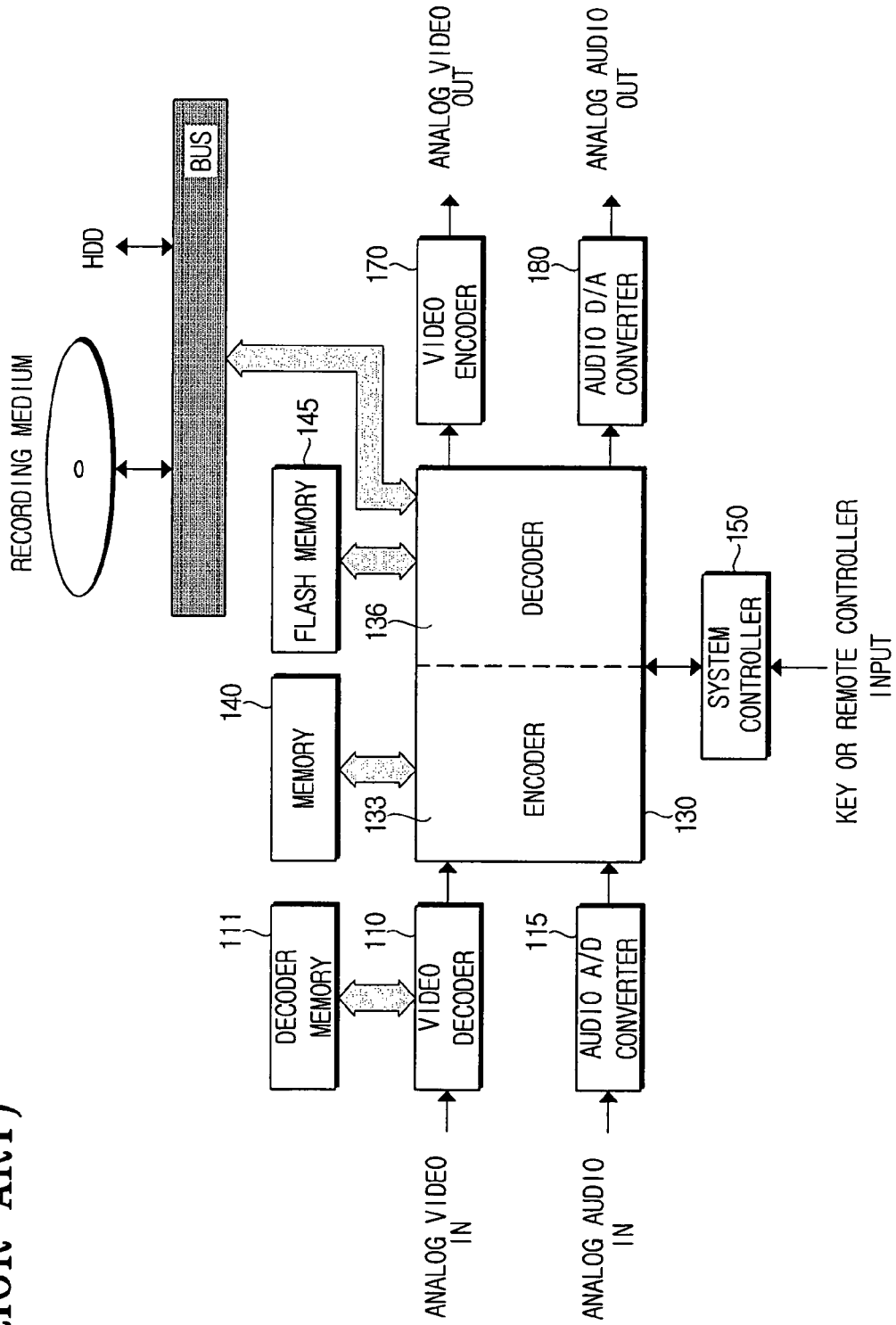
FIG. 1 is a block diagram of an exemplary conventional optical recording/reproducing apparatus.

Reference will now be made in detail to the embodiments of the present invention, examples of which are illustrated in the accompanying drawings, wherein like reference numerals refer to the like elements throughout. The embodiments are described below to explain the present invention by referring to the figures. Detailed descriptions of well-known functions or configurations, considered to unnecessarily distract from an explanation of the present invention, are omitted.

Figure 2:
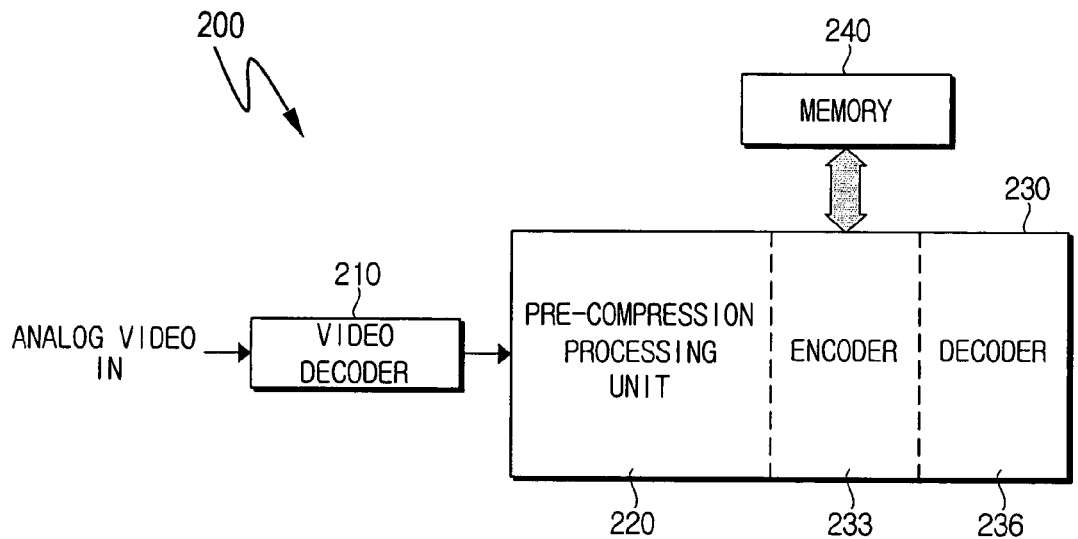
FIG. 2 is a block diagram of an optical recording/reproducing apparatus according to a first embodiment of the present invention.

FIG. 2 is a block diagram of an optical recording/reproducing apparatus 200 according to a first embodiment of the present invention.

The optical recording/reproducing apparatus 200 comprises a video decoder 210, an A/V codec 230, and a memory 240. The A/V codec 230 comprises a pre-compression processing unit 220, an encoder 233, and a decoder 236.

An analog video signal is input to the video decoder 210. The analog video signal may be input through a signal reception antenna and a cable, for example. The analog video signal may be one of a radio frequency (RF) signal with video and audio mixed, a composite video banking sync (CVBS) with color, luminance, and sync mixed as a video signal and provided along with an audio signal, an S-video (Y+C) signal in which luminance, sync and color are mixed, a component signal, and an RGB signal with red, green, blue, and the sync mixed. The video decoder 210 converts the input analog video signal into a digital video signal.

Figure 3:
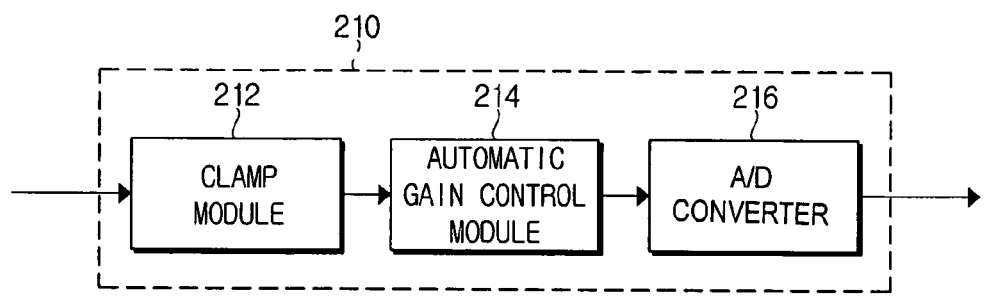
FIG. 3 is a detail block diagram of the video decoder shown in FIG. 2.

FIG. 3 is a detail block diagram of the video decoder 210 shown in FIG. 2. The video decoder 210 comprises a clamp module 212, an automatic gain control module 214, and an A/D converter 216.

The clamp module 212 clamps the input analog video signal to a predetermined reference. The automatic gain control module 214 controls a gain of the clamped analog video signal to a predetermined magnitude. The A/D converter 216 converts the gain-controlled analog video signal into the digital video signal.

Figure 4:
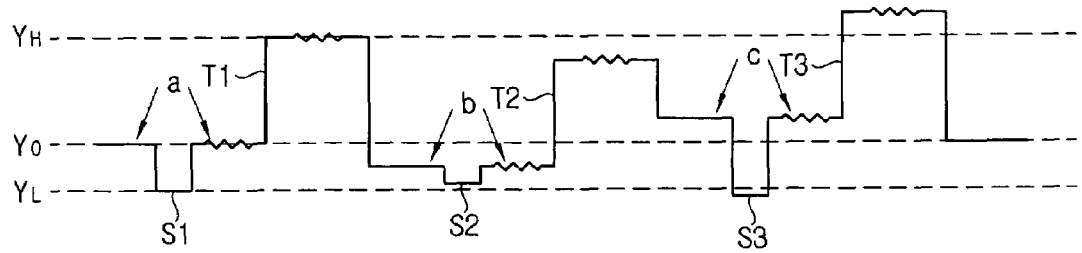
FIG. 4 is a view illustrating an analog video signal.

FIG. 4 is a view illustrating the analog video signal. With respect to a reference level $Y_0$ of FIG. 4, a portion 'a' of the video signal lies at the reference level $Y_0$, a portion 'b' of the video signal is lower than the reference level $Y_0$, and a portion 'c' of the video signal is higher than the reference level $Y_0$. The portions 'b' and 'c' are adjusted to the predetermined reference $Y_0$ by the clamp module 212. If an interval from $Y_0$ to $Y_L$ is referred to as 40IRE, S1 corresponds to 40IRE, however, S2 is smaller than 40IRE and S3 is larger than 40IRE. If an interval from $Y_0$ to $Y_H$ is referred to as 60IRE, T1 corresponds to 60IRE, however, T2 is smaller than 60 IRE and T3 is larger than 60IRE. In other words, the gain is not constant. The automatic gain control module 214 adjusts S2 and S3 to 40IRE and T2 and T3 to 60IRE, controlling the gain to be constant.

The A/V codec 230 compresses the input digital video signal in a predetermined format, or decompresses a compressed digital video signal of predetermined format. Description of the processing in the A/V codec 230 will be made below.

A digital video signal is input from the video decoder 210 to the pre-compression processing unit 220. In general, the input digital video signal has mixed luminance and color components. A signal with mixed luminance and color components is not appropriate to be compressed in the encoder 233, and therefore, the luminance and color components must be separated. The pre-compression processing unit 220 inputs a digital video signal with luminance and color components mixed, and outputs a digital video signal from which luminance and color components are separated.

Figure 5A:
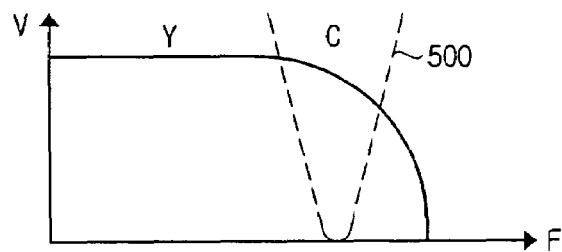
FIGS. 5A, 5B and 5C are views illustrating an example of separating luminance and color components by filtering a digital video signal.
Figure 5B:
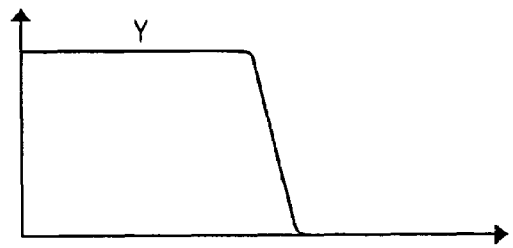
Figure 5C:
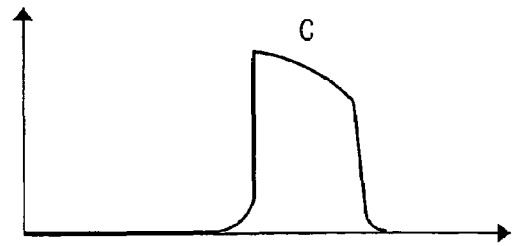

FIGS. 5A to 5C are views for showing an example of separating luminance and color components by filtering the digital video signal.

FIG. 5A is a view for showing an example of a signal with luminance and color components mixed. If filter characteristics are the same as a dashed portion 500 of FIG. 5A, the luminance component Y after filtering may be separated as shown in FIG. 5B, and the color component C may be separated as shown in FIG. 5C. However, due to limits of the filtering characteristics, part of the color component is included in the luminance component, and part of the luminance component is included in the color component. In order to overcome such a problem, a method is used that compares a digital video signal pixel by pixel and separates luminance and color components.

Figure 6A:
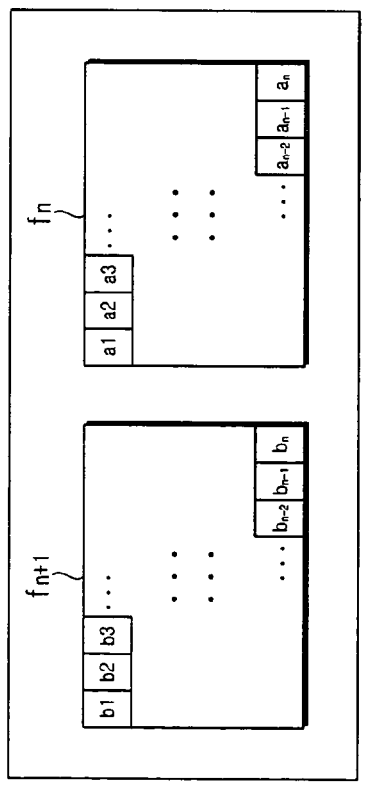
FIGS. 6A and 6B are views illustrating an example of separating luminance and color components by comparing frames of a digital video signal pixel by pixel.
Figure 6B:
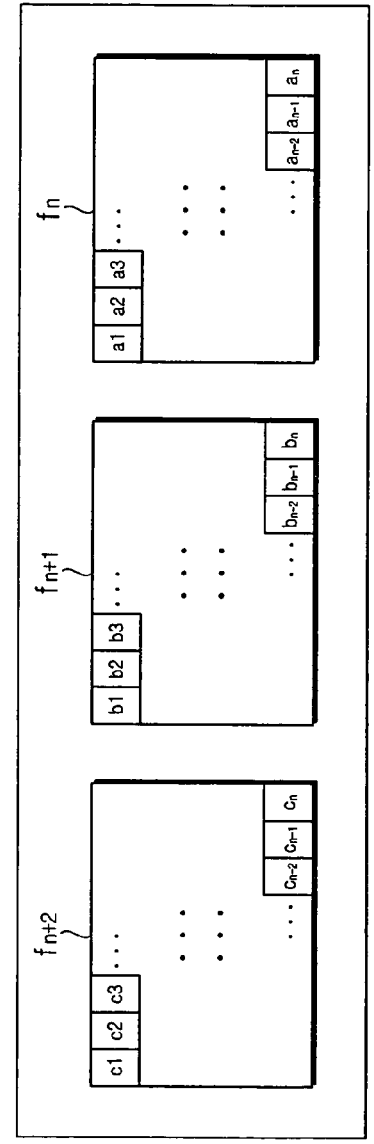

FIGS. 6A to 6B are views for showing an example of separating luminance and color components by comparing a digital video signal pixel by pixel.

FIG. 6A shows two exemplary frames. A frame in computer graphics or television broadcast refers to an image produced through one scan on an entire screen in order to output information on a display unit, that is, an individual image of a moving picture continuously varying with time. Most computer monitors or television sets generate and display 30 or 60 frames per second. The number of frames per second is referred to as a frame frequency or frame transmission rate.

The frame $f_n$ comprises pixels $a_1, a_2, a_3, \ldots, a_n-2, a_n-1$, and $a_n$, and the $f_{n+1}$ comprises pixels $b_1, b_2, b_3, \ldots, b_n-2, b_n-1$, and $b_n$. The luminance and color components are separated by comparing pixels $a_1$ and $b_1$, $a_2$ and $b_2$, ..., and $a_n$ and $b_n$, respectively. For example, the luminance variations and color variations may be used. The separation of the luminance and color components through comparing respective pixels is referred to as 3D separate, wherein the 3D implies comparison of different frames having time differences. As shown in FIG. 6B, the luminance and color components may separated by comparing respective pixels among 3 frames $f_n$, $f_{n+1}$, and $f_{n+2}$.

In order for the video decoder 210 to carry out the 3D separate, a separate memory is required to compare the frames. However, if the 3D separate is carried out in the A/V codec 230, the memory 240 used for the A/V codec 230 is shared. The memory 240 used for the encoder 233 and the decoder 236 may be shared by sharing the storage space of the memory 240. Therefore, the video decoder 210 does not need a dedicated decoder memory, and a size of the video decoder 210 and a production cost are reduced.

Figure 7:
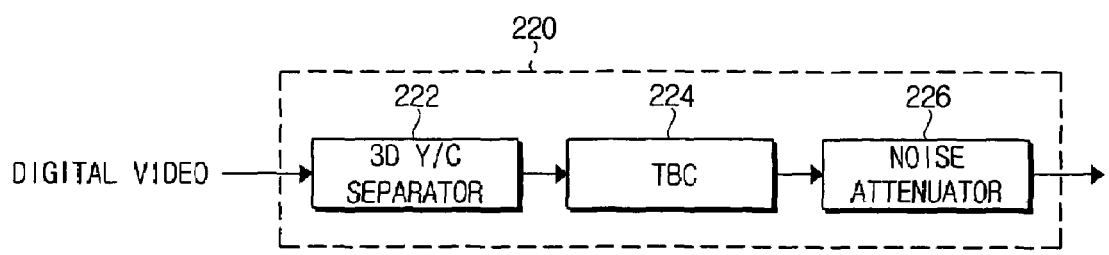
FIG. 7 is a detail block diagram of the pre-compression processing unit shown in FIG. 2.

FIG. 7 is a view for showing the pre-compression processing unit 220 of FIG. 2 in detail.

The pre-compression processing unit 220 has a 3D Y/C separator 222, a time base corrector (TBC) 224, and a noise attenuator 226.

The 3D Y/C separator 222 is input with a digital video signal from the video decoder 210. The 3D Y/C separator 222 compares pixel by pixel a certain number of consecutive fields among the fields of a digital video signal, and then separates the luminance and color components. The 3D Y/C separator 222 uses the memory 240 in comparing the luminance and color components.

The TBC 224 is input, from the 3D Y/C separator 222, with the digital video signal from which the luminance and color components are separated. If sync pulses become unstable with a non-standard signal input, screen defects may occur such as screen shivering, vertical screen variations and imbalance. For example, when a signal is input from a video tape recorder (VCR), the defects occur due to various errors resulting from tape and head traveling, defects of the tape itself and other various mechanical and electrical problems. The TBC is a unit for compensating for the above defects by maintaining stable synchronization through a delay circuit and appropriate digital signal processing. Accordingly, the TBC stabilizes the synchronization of an input digital video signal.

The noise attenuator 226 is input with a stably synchronized digital video signal from the TBC 224. The input digital video signal has noise generated during signal processing. The noise attenuator 226 removes noise other than video signal components. The arrangement of the TBC 224 and the noise attenuator 226 may be interchanged.

If the digital video signal input to the pre-compression processing unit 220 is a digital video signal from which luminance and color components are separated, the digital video signal may be bypassed to the encoder. If there is a need to stabilize synchronization or to remove noise, the digital video signal is outputted to the encoder 233 passing through the TBC 224 and the noise attenuator 226 at least.

Referring again to FIG. 2, the encoder 233 is input, from the pre-compression processing unit 220, with a digital video signal from which luminance and color components are separated. The encoder 233 compresses the input signal in a predetermined compression format. The MPEG format may be used for the predetermined compression format; however, the compression format is not constrained to the MPEG format. The compressed signal is recorded on a recording medium (not shown) or an HDD (not shown). The decoder 236 decompresses a signal compressed and recorded in a predetermined compression format. The decompressed digital video signal is sent to a video encoder (not shown) from the decoder 236. The video encoder converts a digital video signal into an analog video signal. The converted analog video signal is displayed through an output unit (not shown). The analog video signal is denoted as Y/C, Y/Cr/Cb and Y/Pb/Pr, based on a format of the output unit.

The memory 240 is used for a storage space when a signal is processed in the A/V codec 230. That is, the memory 240 is used as a storage space for the pre-compression processing unit 220 as well as for the encoder 233 and the decoder 236, when a signal is processed. The storage space used for the pre-compression processing unit 220 is smaller than that used for the encoder 233 and the decoder 236.

The A/V codec 230 may be constructed in a single chip comprising the pre-compression processing unit 220, the encoder 233, and the decoder 236, or in individual single chips for the pre-compression processing unit 220, the encoder 233, and the decoder 236. Further, a description of audio signal processing in addition to the above will be omitted.

Figure 8:
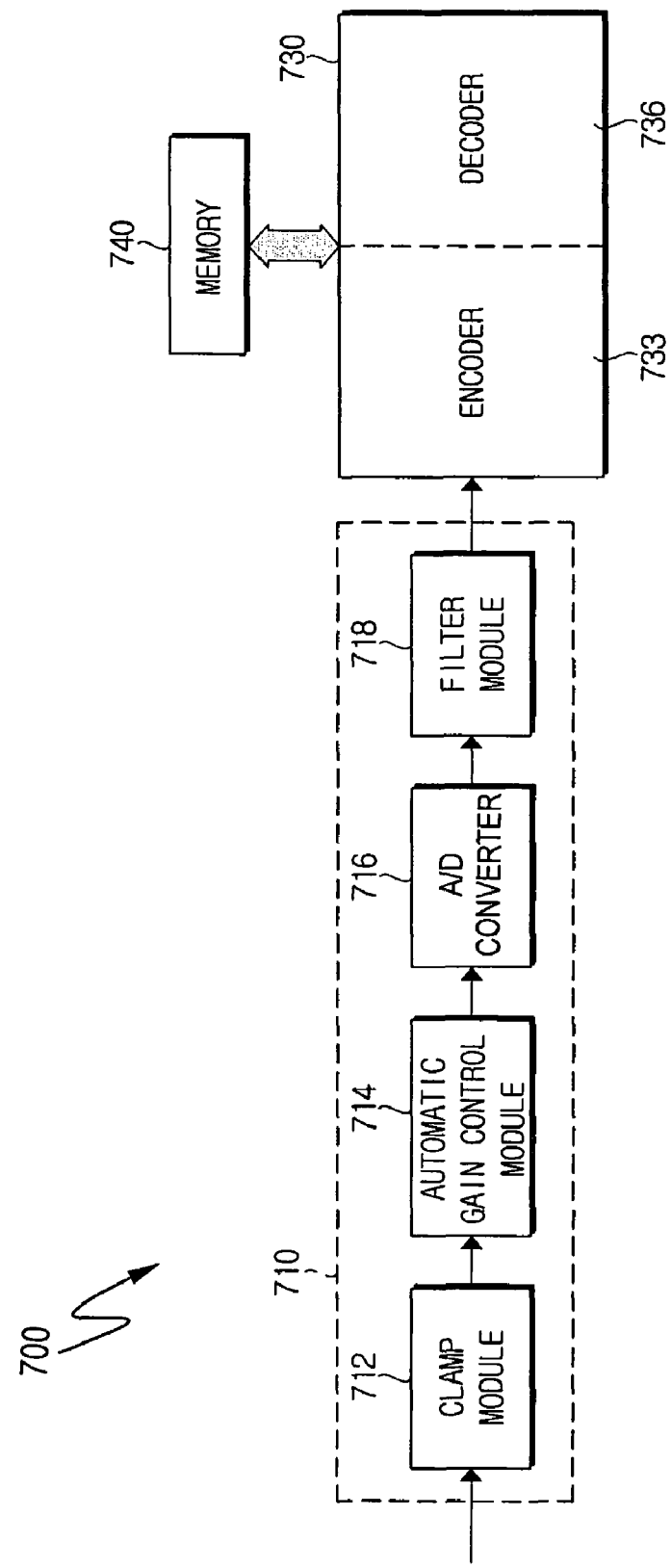
FIG. 8 is a block diagram of an optical recording/reproducing apparatus according to a second embodiment of the present invention.

FIG. 8 is a block diagram for showing an optical recording/reproducing apparatus 700 according to a second embodiment of the present invention.

The optical recording/reproducing apparatus 700 comprises a video decoder 710, an A/V codec 730, and a memory 740. The video decoder 710 comprises a clamp module 712, an automatic gain control module 714, an A/D converter 716, and a filter module 718. The A/V codec 730 comprises an encoder 733 and a decoder 736. When compared to the optical recording/reproducing apparatus 200 of FIG. 2, a dedicated memory is not needed for the video decoder 710, however, the A/V codec 730 does not carry out a function of separating luminance and color components. Only the filter module 718 will be described, excluding a repeated description. A digital video signal is input from the A/D converter 716 to the filter module 718. The filter module 718 filters the input digital video signal to separate luminance and color components. The digital video signal from which luminance and color components are separated is input to the encoder 733.

As can be appreciated from the above description of the first embodiment of the present invention, the A/V codec, rather than the video decoder, carries out the function of separating the luminance and color components. Therefore, the video decoder does not have to include additional circuits for separating the luminance and color components. As a result, the size of the video decoder and the production cost may be reduced.

Further, according to the second embodiment of the present invention, a dedicated memory is not necessary to carry out the function of separating the luminance and color components, and since the memory used for the A/V codec may be shared, the memory is efficiently used.

The foregoing embodiments and advantages are merely exemplary and are not to be construed as limiting the present invention. The present teaching can be readily applied to other types of apparatuses.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical recording/reproducing apparatus for recording and reproducing data to and from an optical medium, comprising:
   a video decoder which converts an analog video signal into a converted digital video signal;
   an audio and video (A/V) codec comprising:
      a pre-compression processing unit which separates luminance and color components from the converted digital video signal,
      an encoder which compresses the digital video signal having the separated luminance and color components in a predetermined compression format, and
      a decoder which decodes the compressed digital video signal; and
   a memory used for a storage space as the A/V codec separates, compresses and decodes the converted video signal,
   wherein the pre-compression processing unit comprises:
      a 3-dimensional(3D) Y/C separator which compares pixel by pixel the predetermined number of consecutive frames among frames of the converted digital video signal and separates the luminance and color components based on the comparison; and
      a time base corrector (TBC) which stabilizes synchronization of the digital video signal having the separated luminance and color components.

2. The optical recording/reproducing apparatus as claimed in claim 1, wherein the pre-compression processing unit filters the converted digital video signal, to separate the luminance and color components.

3. The optical recording/reproducing apparatus as claimed in claim 1, wherein the pre-compression processing unit further comprises a noise attenuator which removes noise included in the synchronization-stabilized digital video signal.

4. The optical recording/reproducing apparatus as claimed in claim 1, wherein the pre-compression processing unit bypasses the converted digital video signal to the encoder if the converted digital video signal comprises separated luminance and color components.

5. The optical recording/reproducing apparatus as claimed in claim 1, wherein the video decoder comprises:
   a clamp module which clamps the analog video signal to a predetermined reference level;
   an automatic gain control module which controls a gain of the clamped analog video signal to a predetermined magnitude; and
   an A/D converter which converts the gain-controlled analog video signal into the converted digital video signal.

6. The optical recording/reproducing apparatus as claimed in claim 1, wherein the analog video signal is one of a radio frequency (RF) signal, a composite video banking sync (CVBS) signal, an S-Video signal, a Y/C signal and a component signal.

7. The optical recording/reproducing apparatus as claimed in claim 1, wherein the predetermined compression format is a moving picture experts group (MPEG) format.

8. An audio and video (A/V) codec comprising:
   a pre-compression processing unit which separates luminance and color components from a digital video signal,
   an encoder which compresses the digital video signal having the separated luminance and color components in a predetermined compression format, and
   a decoder which decodes the compressed digital video signal,
   wherein the pre-compression processing unit comprises:
      a 3-dimensional (3D) Y/C separator which compares pixel by pixel the predetermined number of consecutive frames among frames of the digital video signal and separates the luminance and color components based on the comparison; and
      a time base corrector (TBC) which stabilizes synchronization of the digital video signal having the separated luminance and color components.

9. The audio and video (A/V) codec as claimed in claim 8, wherein the pre-compression processing unit filters the digital video signal, to separate the luminance and color components.

10. The audio and video (A/V) codec as claimed in claim 8, wherein the pre-compression processing unit further comprises a noise attenuator which removes noise included in the synchronization-stabilized digital video signal.

11. The audio and video (A/V) codec as claimed in claim 8, wherein the pre-compression processing unit bypasses the digital video signal to the encoder if the digital video signal comprises separate luminance and color components.

12. The audio and video (A/V) codec as claimed in claim 8, wherein the digital video signal corresponds to an analog video signal which has been converted from one of a radio frequency (RF) signal, a composite video banking sync (CVBS) signal, an S-Video signal, a Y/C signal and a component signal.

13. The audio and video (A/V) codec as claimed in claim 8, wherein the predetermined compression format is a moving picture experts group (MPEG) format.

14. The audio and video (A/V) codec as claimed in claim 8, wherein the pre-compression processing unit, the encoder, and the decoder are formed on a single chip.

15. A method of operating an audio and video (A/V) codec, comprising:
   converting an analog video signal into a converted digital video signal;
   comparing pixel by pixel the predetermined number of consecutive frames among frames of the converted digital video signal;
   separateing luminance and color components based on the comparison;
   stabilizing synchronization of the digital video signal having the separated luminance and color components;
   compressing the digital video signal having the separated luminance and color components in a predetermined compression format; and
   decoding the compressed digital video signal.

16. The method as claimed in claim 15, further comprising:
   bypassing the comparing of the consecutive frames of the digital video signal and the compressing of the digital video signal having the separated luminance and color components if the input digital video signal comprises separate luminance and color components.

17. The method as claimed in claim 15, further comprising: storing signals in a common memory during the comparing of the input digital video signals to separate the luminance and color components and the compressing of the digital video signal having the separated luminance and color components.

* * * * *

UNITED STATES PATENT AND TRADEMARK OFFICE
CERTIFICATE OF CORRECTION

| | | |
|---|---|---|
| PATENT NO. | : 7,391,962 B2 | Page 1 of 1 |
| APPLICATION NO. | : 10/956098 | |
| DATED | : June 24, 2008 | |
| INVENTOR(S) | : Hyoung-woo Jeon | |

It is certified that error appears in the above-identified patent and that said Letters Patent is hereby corrected as shown below:

Column 8, Line 55, change "separateing" to --separating--.

Signed and Sealed this

Fourteenth Day of October, 2008

JON W. DUDAS
*Director of the United States Patent and Trademark Office*